(12) United States Patent
Padan et al.

(10) Patent No.: US 8,377,488 B2
(45) Date of Patent: Feb. 19, 2013

(54) METHOD FOR TREATING OLIVES TO BE UTILIZED FOR OLIVE OIL PRODUCTION

(75) Inventors: Nir Padan, Moshav Sde Itzhak (IL); Yariv Gershony, Hod Haharon (IL); Zohar Kerem, Rehovot (IL); Shimon Lavee, Rehovot (IL)

(73) Assignee: Olive X-Tend Ltd., Hod-Hasharon (IL)

( * ) Notice: Subject to any disclaimer, the term of this patent is extended or adjusted under 35 U.S.C. 154(b) by 133 days.

(21) Appl. No.: 12/862,787

(22) Filed: Aug. 25, 2010

(65) Prior Publication Data
US 2012/0052168 A1 Mar. 1, 2012

(51) Int. Cl.
*A23L 1/164* (2006.01)
(52) U.S. Cl. ........ 426/241; 426/520; 426/417; 426/615; 426/521; 426/524; 426/629; 426/324; 426/327; 426/331; 426/393; 426/410
(58) Field of Classification Search .................. 426/241, 426/417, 520, 615, 521, 524, 629, 324, 327, 426/331, 393, 410
See application file for complete search history.

(56) References Cited

U.S. PATENT DOCUMENTS

| | | | |
|---|---|---|---|
| 3,721,572 A | | 3/1973 | Cory |
| 3,962,474 A | * | 6/1976 | Smith ........................... 426/282 |
| 4,764,385 A | * | 8/1988 | Butland ........................ 426/241 |
| 5,922,374 A | * | 7/1999 | Daury et al. ................... 426/51 |
| 2003/0207007 A1 | * | 11/2003 | Maitland et al. .............. 426/417 |
| 2004/0191382 A1 | * | 9/2004 | Cooper et al. ................ 426/521 |
| 2007/0248736 A1 | * | 10/2007 | Masuda et al. ................ 426/592 |

FOREIGN PATENT DOCUMENTS

| | | |
|---|---|---|
| EP | 1211303 | 6/2002 |
| FR | 2704840 | 11/1994 |

OTHER PUBLICATIONS

Chemical Characteristics NPL, Mar. 30, 2010,http://www.oliveoilsource.com/page/chemical-characteristics.*
Removing bitterness of olives NPL, Oct. 20, 2007, http://www.olives101.com/2006/11/08/removing-bitterness-of-olives-leaves-a-lot-of-salt/.*
Trade Standard Applying to Olive Oils and Olive-Pomace Oils, COI/T.15/NC No. 3/Rev. Nov. 4, 2009.
Farag R S et al: "Stabilization of Olive Oil by Microwave Heating",International Journal of Food and Nutrition, vol. 48, No. 6, Jan. 1, 1997, pp. 365-371.
Luaces P et al: "Thermal Stability of Lipoxy Genase and Hydroperoxide Lyase From Olive Fruit and Repercussion on Olive Oil Aroma Biosynthesis", Journal of Agricultural and Food Chemistry, vol. 55, No. 15, Jun. 27, 2007, pp. 6309-6313.
Garcia Jose M et al:"Hot Water Dipping of Olives (*Olea europaea*) for Virgin Oil Debittering", Journal of Agricultural and Food Chemistry, vol. 53, No. 21, Oct. 2005, pp. 8248-8252.
Perez Ana G et al: "Modification of Volatile Compound Profile fo Virgin Olive Oil Due to Hot-Water Treatment of Olive Fruit", Journal of Agricultural and Food Chemistry, vol. 51, No. 22, Oct. 22, 2003, pp. 6544-6549.

(Continued)

*Primary Examiner* — Drew Becker
*Assistant Examiner* — Preston Smith

(57) ABSTRACT

Methods are provided for treating freshly harvested olives to substantially retain the quality of oil contained therewithin for enabling production of high quality olive oil from said treated olives at a prolonged time after harvest and treated freshly harvested olives with retained oil qualities characterized in that the oil extracted therefrom after a prolonged storage time meets the standards of the IOC for Virgin Olive Oils.

15 Claims, 1 Drawing Sheet

OTHER PUBLICATIONS

Cruz S et al: "Heat Treatment Improves Olive Oil Extraction", JAOCS, Journal of the American Oil Chemists' Society, vol. 84, No. 11, Nov. 2007, pp. 1063-1068.

Remeo F V et al:"Effects of Post-Fermentation Processing on the Stabilisation of Naturally Fermented Green Table Olives (cv *Nocellara etnea*)", Food Chemistry, vol. 116, No. 4, Oct. 15, 2009, pp. 873-878.

Luaces P et al:"Effects of Heat-Treatments of Olive Fruit on Pigment Composition of Virgin Olive Oil", Food Chemistry, vol. 90, No. 1-2, Mar. 1, 2005, pp. 169-174.

* cited by examiner

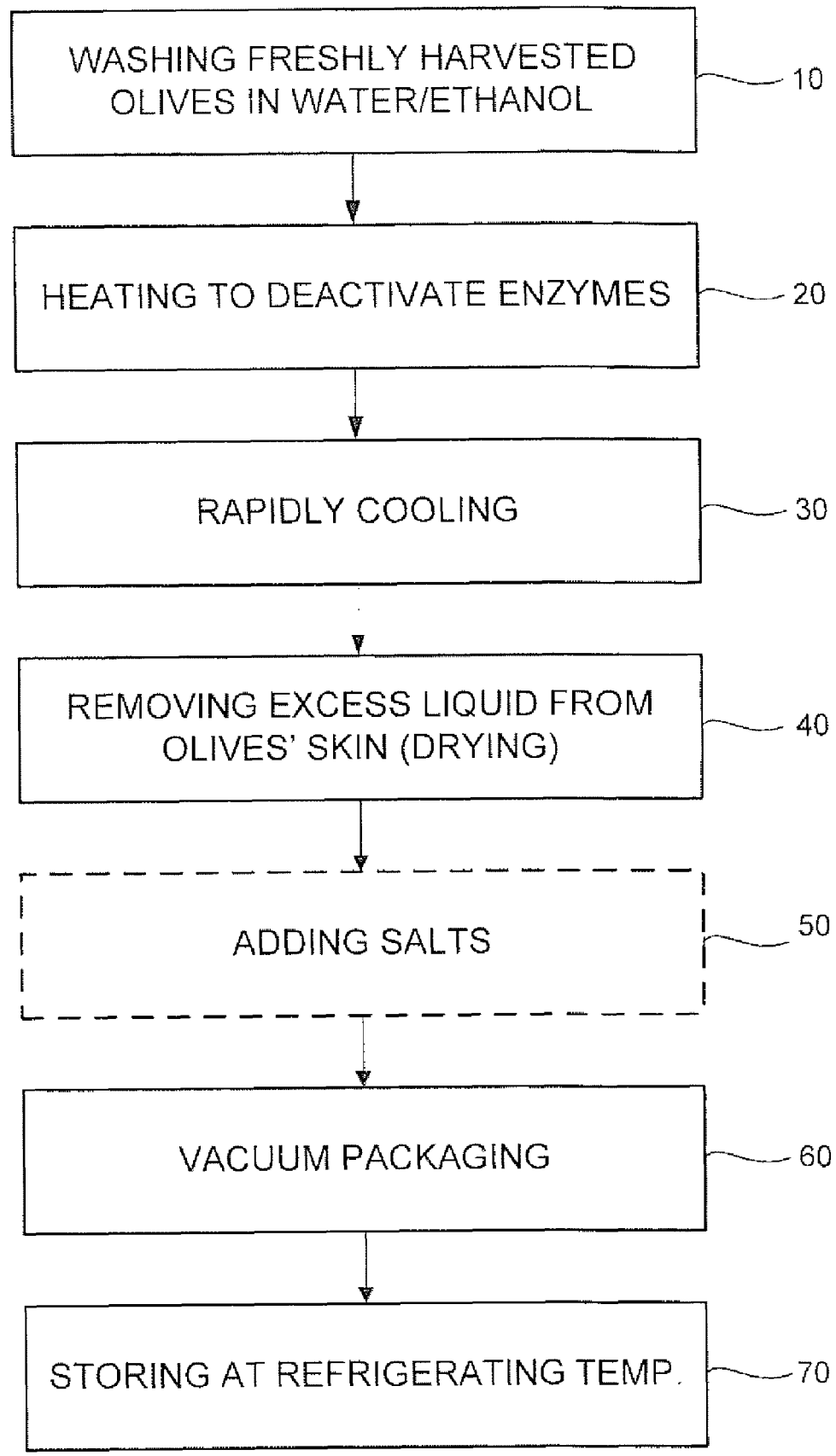

METHOD FOR TREATING OLIVES TO BE UTILIZED FOR OLIVE OIL PRODUCTION

BACKGROUND OF THE INVENTION

1. Field of the Invention

The present invention generally relates to olive oil production and more specifically to olive oil production at a prolonged time after olive harvesting.

2. Discussion of the Related Art

Olive oil is produced by grinding fresh olives into a paste and extracting the oil from the paste by mechanical or chemical means. The amount of oil contained in the olive depends on the particular cultivar and the degree of ripeness. Typically 1 Kg of olives yields about 150-200 ml of oil. The oil is accumulated in the mesocarp cells, mostly in the vacuoles and to a smaller extent in the cytoplasm. Grinding or crushing of the olives breaks the olive stones and flesh, creating a paste. Typically, grinding is followed by malaxation of the paste to facilitate breaking of the mesocarp cells, assisted by the sharp stone segments, thus releasing the oil contained in the vacuoles and resulting in coalescence of the oil droplets and separation of the liquids from the solids. The liquid, which contains both oil and vegetation water, is extracted from the paste by applying pressure or centrifugation and is then separated into oil and water. Depending on the specific method and equipment, the separation of the paste into liquid and solid and the separation of the liquid into oil and water may be performed sequentially or concurrently. There exist various modifications of these basic steps. For example, the method known as "Sinolea" is based on the different surface tension of the vegetable water and the oil. According to this method, rows of metal discs or plates are dipped into the paste. The oil adheres to the metal disks and is removed with scrapers in a continuous process while the solid and water phases stay behind.

The quality of olive oil depends on the extraction method, the olive cultivar, the maturity (ripeness) index of the olives and also, to a great extent, on the time delay between olive harvest and oil extraction. Because olive oil is extracted from the fruit flesh, the time elapsing from harvesting to oil extraction is very crucial. In the period between harvesting and oil extraction, the fruits' enzymes are very active. The oxidation and enzymatic reactions, which begin in the fruit immediately upon harvesting, increasingly degrade the quality of the oil. Therefore, olive oil needs to be extracted from the fresh harvested olives as soon as possible, preferably within no more than 24 hours. Oil obtained after a longer wait is of lower quality presenting higher acidity levels. Thus, unlike seed oils (e.g. sunflower oil, sesame oil, soybeans oil, etc.) which are extracted from seeds or nuts that can be stored for prolonged time and processed all year round, the olive oil industry is a seasonal industry which depends on availability of fresh olives. Harvesting time varies in each country and with the season and the cultivar. Generally, fresh olives are available for about four months during opposing seasons in the Northern and Southern hemispheres (October to January in the Northern Hemisphere and April to July in the Southern hemisphere). Another important factor that influences the oil quality is the freshness of the olive oil itself, namely the storage period and the storage conditions until consumption. Olive oil, even when stored under optimal conditions, deteriorates over time. It is therefore recommended to consume olive oil close to its production time.

The quality of olive oil can be characterized by various analytic and organoleptic parameters, the most common being the free fatty acid (FFA) expressed as percent of oleic acid. Other characteristics include peroxide value and various positive and negative organoleptic attributes. Most countries use the International Olive Council (IOC) standards for defining oil quality and oil category. The IOC, which has a United Nations charter to develop criteria for olive oil quality and purity, consolidates standards for olive oils categories as well as guidelines for analyzing and tasting the oils. For example, olive oils that can be qualified under the category of virgin olive oils are oils that are obtained from the olives by using only mechanical or other physical means which do not involve any chemical processes such as use of solvents or re-esterification. Additionally, they should meet the specific standards set by the IOC with regard to the concentration of specific ingredients and organoleptic tests. Within the Virgin Olive Oil category, the oils fit for consumption are classified as Extra Virgin Olive Oil, Virgin Olive Oil and Ordinary Virgin Olive Oil according to their FFA level ($\leq 0.8\%$, $\leq 2\%$ and $\leq 3.3$, respectively).

Olive oil production is a traditional industry originating in the Mediterranean and known since as early as 3,000 B.C. Today, olives are cultivated in many regions of the world and olive oil is used throughout the world. However, olive oil production and consumption is still the highest in the Mediterranean. The oil is considered to be a prime component of the so called 'Mediterranean diet'.

In recent years, the olive oil market has been growing dramatically. The increasing interest in olive oil stems from both its unique rich taste and its health benefits and coincides with the growing public awareness to health food, as well as with the general increasing interest in gourmet food. The health benefits associated with olive oil consumption include controlling LDL level while raising HDL level and reducing risk of coronary heart diseases. These health benefits are attributed to the high level of monounsaturated fatty acids, mainly oleic acid, and to the relatively high content of minor nutrients, in particular anti-oxidants such as polyphenols. Studies also suggest beneficial effects of olive oil consumption on blood sugar level and on the gastrointestinal tract, including reducing the risk of ulcers, gastritis and colon cancer. Indeed, olive oil is considered by many to be superior to other vegetable oils. However, side by side with the prosperity in the olive oil market, the olive oil fraud industry flourishes as well. Olive oil is one of the most adulterated agricultural products. Customers are therefore becoming increasingly aware of the possibility that oil distributed as high quality olive oil is actually adulterated oil mixed with, or even consists almost entirely of, inferior oils of lower cost.

The awareness to health food products, as well as to their freshness and authenticity, has brought with it a new trend of small scale production of basic food products (e.g. bread) for self consumption at home or in small food establishments such as restaurants, delicatessen and specialized boutiques. This way control over freshness and ingredients is ensured. In accordance with this trend, small scale appliances, sized to be placed on a kitchen counter, such as bread machine, home-use coffee roasting device, etc., are now gaining popularity. With respect to olive oil, recent years show an increasing number of olive oil boutiques which specialize in production of high quality oil by careful selection of olives and close control over production. A household countertop cold press machine for producing small quantities of olive oil designed by the inventors of the present invention is described in international publication WO2010/007610. However, although olive oil can be consumed as is when freshly pressed from the fruit, the need to extract olive oil within a very short time from harvesting does not enable producing olive oil out of season or in countries distant from olive growing regions.

It is therefore the general object of the present invention to provide olives suitable for oil extraction all year round and/or at locations remote from olive growing regions.

In particular, it is all object of the invention to provide olives which retain their oil qualities for a prolonged storage period without adding chemical food preservatives.

It is a further object of the invention to provide methods for treating freshly harvested olives to substantially retain their oil quality for a prolonged time after being treated so as to enable extraction of high quality oil from the olives at a prolonged time after they have been harvested.

SUMMARY OF THE PRESENT INVENTION

One aspect of the invention is a method for treating freshly harvested olives to substantially retain the quality of oil contained therewithin for enabling production of high quality olive oil from said treated olives at a prolonged time after harvest. The method comprises: washing the freshly harvested olives in a washing liquid; heating the olives to a temperature sufficient to achieve enzymatic inactivation; rapidly cooling the heated olives to a temperature in the range of 0 to $-10°$ C.; vacuum packaging a predetermined quantity of olives: and storing the packed olives at a refrigerating temperature. The specific conditions in each step of the method are preselected in accordance with the cultivar and maturity index of the treated olives. The washing liquid may be water or ethanol or a mixture thereof. The heating may be performed by subjecting the olives to microwave radiation or by immersing the olives in a liquid bath of said predetermined temperature. In accordance with some embodiments of the invention, a salt or a mineral powder is added to the treated olives before packaging. The salt or mineral powder may be NaCl, KCl, $NAHCO_3$, talcum powder and lime powder, or a combination thereof.

Another aspect of the invention is treated freshly harvested olives with retained oil qualities characterized in that the oil extracted from the treated olives at a prolonged storage time after being treated is characterized by having a Free Fatty Acid (FFA) level of no more than 2%. According to some embodiments of the invention, the treated freshly harvested olives with retained oil qualities are obtainable by the method described above and are characterized in that the oil extracted from the treated olives at a prolonged storage time after being treated is characterized by having a Free Fatty Acid (FFA) level of no more than 2%. According to some embodiments, the Free Fatty Acid level may be of less than or equal to 0.8%. The prolonged storage time is of at least one month. The prolonged storage time is of at least one month. For some embodiments, the prolong storage time may be of at least three months or of at least six months. Preferably, the oil extracted from the treated olives after a storage time of at least 2 months has a Free Fatty Acid (FFA) level which does not exceed the FFA level in the oil extracted at the time immediately after treatment by more than 1%. Preferably, the freshly harvested olives are treated within 24 hours from being harvested and are vacuum packaged and kept at refrigerating temperatures until use. Extraction of oil from the treated olives of the invention for the purpose of measuring FFA level or other parameters is preferably performed by using an Abencor system.

According to some embodiments of the invention the oil extracted from the treated olives after the prolonged storage time is further characterized by having a peroxide value that meets the standard of the International Olive Council (IOC) for peroxide value in Virgin Olive Oils and/or organoleptic characteristics that meet the standards of the International Olive Council (IOC) for organoleptic characteristics of Virgin Olive Oils.

Yet a further aspect of the invention is a vacuum package comprising treated olives of the invention, optionally further comprising a salt or mineral powder selected from one or more of the following: NaCl, KCl, $NaHCO_3$, talcum powder and lime powder.

BRIEF DESCRIPTION OF THE DRAWINGS

The present invention will be better understood and appreciated from the following detailed description taken in conjunction with the drawings in which:

FIG. 1 is an overall flow chart illustrating the method of treating freshly harvested olives in accordance with an embodiment of the present invention.

DETAILED DESCRIPTION OF THE PREFERRED EMBODIMENTS

The present invention is generally directed at enabling off-seasonal olive oil production and/or at areas remote from olive growing regions. In accordance with the invention, freshly harvested olives are treated to substantially retain their oil qualities for a prolonged time after treatment such that when stored under appropriate conditions they can be used as a "raw material" for olive oil production at a prolonged time after being harvested. The treated olives can be stored for at least one month and up to at least ten months or even for longer periods, providing the capability to produce fresh olive oil all year round. Preferably, the treated olives are packaged into relatively small quantities of 0.5 to 5 Kg that can be shipped and distributed to retailers and consumers. Preferably, the treated olives maintain the appearance and texture of fresh olives.

The oil extracted from the stored treated olives of the invention is characterized by having Free Fatty Acidity (FFA) of no more than 2% and other characteristics, such as peroxide value and organoleptic characteristics that meet the standards of the International Olive Council (IOC) for the category of Virgin Olive Oils. In this respect, it should be emphasized that in the context of the invention, extraction of oil mainly refers to purely mechanical or other physical extraction methods that do not involve chemical processing. Thus, the expression "oil extracted from the treated olives" should be understood as oil extracted by purely mechanical or other physical means. More specifically, since even when the oil is extracted by purely mechanical means, its composition may vary with specific method and specific conditions, extraction of oil from the treated olives of the invention for the purpose of assessment is preferably performed using an Abencor system.

The invention further provides methods for treating freshly harvested olives to substantially retain their oil qualities for a prolonged storage time under refrigerating temperatures without adding any chemical food preservative.

The olives selected to undergo the treatment process of the invention should be freshly harvested, high quality olives carefully selected. Any bruised, defected or otherwise poor quality olives and any twigs, stems and leaves should be carefully removed before treatment. The selected olives may be of any maturity index, preferably in the range of 2-6, and of any olive cultivar, or a mixture of different cultivars. In accordance with some embodiments of the invention, the olives are organically grown olives.

FIG. 1 is a flow chart of the process of treating freshly harvested olives, in accordance with an embodiment of the invention. The process may be performed in a batch manner or may be a continuous process with any degree of automation. In order to obtain high quality oil from the end product of the process, the treatment is preferably performed within 24 hours from harvesting. The exact conditions in each step (e.g. temperatures, duration of step, etc.) vary with the specific cultivar and maturity index of the treated olives and are pre-selected for each cultivar/maturity-index combination to optimize results.

Referring to FIG. 1, the first step (10) in the process is washing the olives to remove pesticides, dust, and any dirt left on the surface of the fruit. Preferably, this step is performed by immersing the olives in a liquid bath at room temperature for about 0.5 to 10 minutes. The washing liquid may be water or ethanol or a mixture thereof. Use of ethanol in the washing step provides the benefits of disinfection in addition to general cleaning. It also facilitates evaporation of the washing liquid from the olives' surface upon drying.

In the next step (20) the olives are heated to a predetermined temperature in the range of about from 40 to 80° C. for deactivating the enzymes present in the fruit so as to stop any enzymatic reactions. In accordance with one embodiment, step 20 is performed by immersing the olives in a liquid bath at the selected temperature for about 2 to 10 minutes. The liquid may be water or ethanol or a mixture thereof. Alternatively, heating may be performed by subjecting the olives to microwave radiation.

In the next step (30), the heated olives are rapidly cooled to a temperature in the range of 0° to −10° C. to prevent overheating and possible oxidation or any other reactions. Step 30 may be performed by immersing the olives in an ice-water, by cold air blowers or by any other method known in the art.

In the next step (40) the olives are dried, if necessary, by blowing dry air to remove any water left on their skins and in the following step (60) predetermined quantities of olives are packaged in sealed vacuum packages in air impervious flexible film, using standard equipment typical in the art. The packaged olives are then stored at regular refrigeration temperatures of 0-4° C. (step 70). Once the treated olives are sealed in packages, the packages can be handled in an integral manner from the packaging area to storage and through distribution channels to the final consumption site using regular refrigeration equipment.

Optionally, different salts and/or mineral powders may be added to the olives (step 50) before packaging for inhibiting mold growth and for maintaining the fruit texture by lowering the water activity of the olives. The added salts and mineral powders also facilitate phase separation between the oil and vegetable water during the oil extraction process. Optional added minerals are selected from sodium chloride, potassium chloride, sodium bicarbonate, micronized talc and lime powder. The amount of added salts and/or minerals is preferably 50 g or more per 1 Kg of packed olives.

EXAMPLE 1

Fresh olives from three different harvests in winter 2007-2008 were treated according to a first treatment procedure (treatment procedure 1) of the invention as in the following: After cleaning and washing, the freshly harvested olives were subjected to microwave radiation of 600 Watt for 1 minute, followed by immediate cooling in ice water. The olives were dried, vacuum packed into packages of 700 g (using a LEVAC C30 M8 vacuum packaging machine, manufactured by Lerica. Italy) and stored at 4° C. At one, three and five months after treatment, oil was extracted from one or more packages of the olives using an Abencor system (MC2 Ingenieria y Sistemas, Barcelona, Spain). Organoleptic characteristics assessment and analysis of the extracted oil for Free acidity (FFA), peroxide level and polyphenols concentration were carried out according to the IOC guidelines. The results are summarized in Table 1.

Analysis methods: Determination of free acidity and peroxide value were carried out following the analytical methods recommended by Commission Regulation EEC no 2568/91 of Jul. 11, 1991. Free acidity given as a percentage of oleic acid, was determined by titration of a solution of oil in ethanol-ether (1:1) with ethanolic potash. Peroxide value, expressed in milliequivalents of active oxygen per kilogram of oil (meq/kg) was determined as follows: a mixture of oil and isooctane-acetic acid 3:2 was left to react in darkness with a potassium iodide solution: the free iodine was then titrated with a sodium thiosulfate solution. Extraction and Analysis of Phenolics: Phenolic fraction was isolated from a solution of oil in hexane by triple extraction with water-methanol (60:40 v/v). Total phenols, expressed as catechin equivalents (ppm), were determined with a UV-visible spectrophotometer (Beckman Coulter. Inc. Fullerton, Calif., US) at 735 nm using the Folin-Ciocalteu reagent. Phenolic compounds were separated by a HPLC system consisting of a TSP P4000 pump coupled to a UV 6000LP Diode Array detector and with Chromquest software. Analytical separation was achieved on an Ultrasphere RP-C18, 5 μm column (250×4.6 mm i.d.) (Beckman, USA). Phenolic compounds were monitored at 280 nm. and identified on the basis of their absorbance spectrum and retention times compared to those of standard compounds following the IOC official method (COI/T.20/Doc No. 29).

TABLE 1

Assessment of oil extracted from three harvests (treatment procedure # 1)

| Variety, orchard & Date | Storage period (months) | FFA[1] (%) | Peroxide Value[2] | Poly-phenols content in [mg/kg Oil] | Organoleptic assessment |
|---|---|---|---|---|---|
| Picual, Kish 14 Dec. 2007 | 1 | 0.23 | 3.28 | 210.0 | Bitterness level 1, pungency level 0 |
|  | 3 | 0.30 | 2.03 | 141.0 |  |
|  | 5 | 0.64 | 8.76 | 142.0 |  |
| Picual, Revivim, 27 Dec. 2007 | 0 | 0.10 | 2.20 | 175.0 | Fruity and grassy oil (level 4-5), Bitterness level 0, pungency level 3 |
|  | 1 | 0.64 | 3.17 | 125 |  |
|  | 3 | 1.57 | 3.55 | 108.0 |  |
|  | 5 | 1.45 | 6.80 | 130.0 |  |
|  | 0 | 0.06 | 5.50 | 168.0 | Strong "apple smell" and aroma, Bitterness level 1, pungency level 2-3 |
| Picholine, Gshur 03 Jan. 2008 | 1 | 0.24 | 2.48 | 136.0 | Fine "apple smell", Bitterness level 1, pungency level 2 |
|  | 3 | 0.27 | 3.35 | 100.0 |  |
|  | 5 | 0.35 | 4.08 | 111.0 |  |

[1]FFA is expressed as % free oleic acid (grams of oleic acid per 100 grams oil);
[2]Peroxide level measured in millieq. of oxygen/kg Oil The results clearly demonstrate that the free acid level remains below 2% for all samples, including those extracted after 5-months storage period. The peroxide value remains well below the standard of the IOC for Virgin Olive Oil (≦20 millieq. Peroxide oxygen per Kg/oil)

EXAMPLE 2

Picual olives from the same harvest (Revivim, 18.12.2008) were treated by four different procedures as in the following:

Treatment procedure #2: 1 min in 70% EtOH/Ice water cooling/Vacuum packaging/4° C. storage Treatment procedure #3: 1 min in 70% EtOH/Ice water cooling/100 gr KCl per 700 gr olives/Vacuum packaging/4° C. storage Treatment procedure #4: 4 min at 60°/Ice water cooling/Vacuum packaging 14° C. storage Treatment procedure #5: 4 min at 60°/Ice water cooling/100 gr KCl per 700 gr olives/Vacuum packaging/4° C. storage Oil was extracted from treated olives immediately after treatment (t=0) and after 2.5 month storage period. Oil assessment and analysis was performed as in Example 1. The results are summarized in Table 2.

TABLE 2

Assessment of oil extracted from olives of the same harvest treated according to different procedures

| Treatment procedure number | Storage period (months) | FFA[1] (%) | Peroxide Value[2] | Polyphenols content in [mg/kg Oil] | Organoleptic assessment |
|---|---|---|---|---|---|
| 2 | 0 | 0.17 | 6.34 | 103.84 | Strong fruitness, "orange smell", Bitterness level 2-3, pungency level 0 |
|   | 2.5 | 0.37 | 5.89 | 65.09 |   |
| 3 | 0 | 0.13 | 5.89 | 281.30 |   |
|   | 2.5 | 0.20 | 5.43 | 189.86 |   |
| 4 | 0 | 0.24 | 11.10 | 87.18 | Delicate oil, fruity aroma |
|   | 2.5 | 0.35 | 4.98 | 33.71 | Good oil, neutral |
| 5 | 0 | 0.21 | 7.93 | 91.05 | Good oil, balanced (slightly strong), low bitterness, pungency level 2 |
|   | 2.5 | 0.22 | 8.15 | 54.24 | Good oil |

EXAMPLE 3

The procedure 5 in Example 2 was repeated with Koroneiki olives. Oil was extracted from treated olives immediately after treatment (t=0) and after 2.5 month storage period. Oil assessment and analysis was performed as in Example 1. The results are summarized in Table 3.

TABLE 3

Assessment of oil extracted from Koroneiki olives treated according to treatment procedure # 5

| Treatment number | Storage period (months) | FFA[1] (%) | Peroxide Value[2] | Polyphenols content in [mg/kg Oil] | Organoleptic assessment |
|---|---|---|---|---|---|
| 5 | 0 | 0.24 | 4.53 | 413.42 | Good oil, bitterness level 5, pungency level 2, fruity and grassy |
|   | 2.5 | 0.35 | 5.89 | 370.80 | Fruity-grassy oil (balanced), high bitterness |

As can be clearly seen, the oils extracted in both Examples 2 and 3 meet the criteria of the IOC for Extra Virgin Olive Oil with respect to free acidity and peroxide level (≦0.8%, ≦20 millieq. Peroxide oxygen per Ka oil, respectively).

It will be appreciated by persons skilled in the art that the present invention is not limited to what has been particularly shown and described hereinabove. Rather the scope of the present invention is defined only by the claims which follow.

The invention claimed is:

1. A method for treating freshly harvested olives to substantially retain the quality of oil contained there within for enabling production of olive oil from said treated olives at a prolonged time after harvest, the method comprising:
   washing the freshly harvested olives in a washing liquid;
   heating the olives to a temperature sufficient to achieve enzymatic inactivation;
   rapidly cooling the heated olives to a temperature in the range of 0 to −10°C.;
   removing excess liquid from surface of olives;
   adding a salt or a mineral powder;
   vacuum packaging a predetermined quantity of olives with said added salt or mineral powder; and
   storing the packed olives at a refrigerating temperature;
   thereby obtaining packaged olives which contain oil for a prolonged storage period, said oil has a Free Fatty Acid (FFA) level of no more than 2%.

2. The method of claim 1 wherein said washing liquid is water or ethanol or a mixture thereof.

3. The method of claim 1 wherein said heating is to a predetermined temperature in the range of 40 to 80° C.

4. The method of claim 1 wherein said heating is performed by subjecting the olives to microwave radiation.

5. The method of claim 1 wherein said heating is performed by immersing the olives in a liquid bath of said predetermined temperature.

6. The method of claim 1 wherein said rapidly cooling is performed by immersing the olives in an ethanol/ice water bath.

7. The method of claim 1 wherein said salt or mineral powder is selected from the group consisting of NaCl, KCl, NAHCO$_3$, talcum powder and lime powder, or a combination thereof.

8. The method of claim 1, wherein the specific conditions in each step of the method are preselected in accordance with the cultivar and maturity index of the freshly harvested olives.

9. The method according to claim 1, wherein said treated freshly harvested olives are used as a raw material for producing oil at a prolonged time after being harvested, characterized in that the oil contained in said olives after a storage period of at least two months after being treated has a Free Fatty Acid(FFA) level of no more than 2%.

10. The method according to claim 9, wherein said Free Fatty Acid(FFA) level is less than or equal to 0.8%.

11. The method according to claim 9, wherein the oil is further characterized by having a Peroxide value of no more than 20 (in milliequivalent Peroxide oxygen per Kg oil).

12. The method according to claim 9, wherein the oil contained in said treated olives after a storage period of at least two months after being treated has a Free Fatty Acid (FFA) level which is no more than 1% FFA higher than the FFA level in the oil contained in said treated olives at the time immediately after being treated.

13. The method according to claim 1, wherein said olives are treated within 24 hours from being harvested.

14. The method according to claim 1, wherein the oil contained in said treated olives after a storage period of at least three months after being treated is characterized by having a Free Fatty Acid (FFA) level of no more than 2%.

15. The method according to claim 1, wherein the oil contained in said treated olives after a storage period of at least six months after being treated is characterized by having a Free Fatty Acid (FFA) level of no more than 2%.

* * * * *